US009933868B2

(12) United States Patent
Dighde et al.

(10) Patent No.: US 9,933,868 B2
(45) Date of Patent: Apr. 3, 2018

(54) FLEXIBLE TOUCH SENSOR (71) Applicant: Microsoft Technology Licensing, LLC, Redmond, WA (US)

(72) Inventors: Rajesh Manohar Dighde, Redmond, WA (US); Sung Ku Lee, Bellevue, WA (US); Christopher A. Whitman, Fort Collins, CO (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/572,696

(22) Filed: Dec. 16, 2014

(65) Prior Publication Data
US 2016/0170511 A1 Jun. 16, 2016

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0416* (2013.01); *G06F 2203/04102* (2013.01)

(58) Field of Classification Search
CPC .................. G06F 3/041; G06F 2203/04102
See application file for complete search history.

(56) References Cited

U.S. PATENT DOCUMENTS

| | | | |
|---|---|---|---|
| 7,218,498 B2 | 5/2007 | Caldwell | |
| 7,439,962 B2 | 10/2008 | Reynolds et al. | |
| 8,373,664 B2 | 2/2013 | Wright | |
| 2005/0206585 A1 | 9/2005 | Stewart et al. | |
| 2006/0109394 A1* | 5/2006 | Miyagawa | G02F 1/13452 349/58 |
| 2007/0158835 A1* | 7/2007 | Lin | H01L 23/5226 257/734 |
| 2008/0303798 A1 | 12/2008 | Matsudate et al. | |

(Continued)

FOREIGN PATENT DOCUMENTS

| | | |
|---|---|---|
| JP | 2011076514 | 4/2011 |
| WO | WO-2007008518 | 1/2007 |
| WO | WO-2014043325 | 3/2014 |

OTHER PUBLICATIONS

Kawahara,"Instant Inkjet Circuits: Lab-based Inkjet Printing to Support Rapid Prototyping of UbiComp Devices", In Proceedings of the ACM International Joint Conference on Pervasive and Ubiquitous Computing, Sep. 8, 2013, 10 pages.

(Continued)

*Primary Examiner* — Afroza Chowdhury (57) ABSTRACT

Flexible touch sensor techniques are described. A touch sensitive device includes a printed circuit board (PCB) having a touch controller and a flexible printed circuit having a flexible substrate and touch sensors formed thereon using a plurality of flexible traces arranged to detect proximity of an object. The plurality of flexible traces are extended along the flexible substrate to directly terminate onto a connector of the printed circuit board thereby forming a communicative coupling between the touch sensors and the touch controller, which thereby permits the touch controller to determine a location of the proximity of the object in relation to the touch sensors.

20 Claims, 6 Drawing Sheets

(56) References Cited

U.S. PATENT DOCUMENTS

| | | | |
|---|---|---|---|
| 2010/0156810 A1* | 6/2010 | Barbier | G06F 3/044 |
| | | | 345/173 |
| 2011/0051888 A1 | 3/2011 | Astley et al. | |
| 2012/0092285 A1 | 4/2012 | Osborn et al. | |
| 2012/0287066 A1* | 11/2012 | Yang | G06F 1/1626 |
| | | | 345/173 |
| 2013/0021268 A1 | 1/2013 | Lee et al. | |
| 2013/0135833 A1 | 5/2013 | Chen et al. | |
| 2013/0147720 A1* | 6/2013 | Yilmaz | G06F 1/1635 |
| | | | 345/173 |
| 2014/0111953 A1 | 4/2014 | McClure et al. | |
| 2014/0113463 A1 | 4/2014 | Peterson et al. | |
| 2014/0176819 A1 | 6/2014 | Yilmaz | |
| 2014/0219523 A1 | 8/2014 | Perezselsky et al. | |
| 2014/0254111 A1* | 9/2014 | Yamazaki | H01L 51/0097 |
| | | | 361/749 |
| 2015/0162388 A1* | 6/2015 | Kim | H01L 27/323 |
| | | | 257/40 |
| 2016/0172428 A1* | 6/2016 | Song | H01L 27/3276 |
| | | | 257/99 |

OTHER PUBLICATIONS

"International Search Report and Written Opinion", Application No. PCT/US2015/063561, dated Feb. 16, 2016, 12 Pages.

\* cited by examiner

FLEXIBLE TOUCH SENSOR

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Touch sensors are utilized in a variety of different devices, such as to detect proximity of an object for touchscreen devices including mobile phones and tablets, dedicated touchpads, wearable devices, and so forth. Conventional touch sensors are formed using a substrate that is then connected to a different substrate, e.g., a motherboard. In order to do this, conventional techniques employ a rigid circuit or flexible printed circuit (FPC) that is interconnected to circuit terminations of the substrate of the touch sensors and is also interconnected to circuit terminations of the different substrate. Thus, these conventional techniques involve multiple interconnects.

Formation of these interconnects typically involves optical, semi-automatic or mechanical alignment and thus, the tolerances of a pitch of the interconnect is made stricter in conventional techniques to take this into account. Additionally, conventional FPCs have a thickness to support signal communication that creates issues when bending the FPCs and thus requires clearances from other system level components for ease of assembly. Also, thickness of conventional FPCs creates a strain on interconnects and thus can result in disconnections due to peeling and delamination. Accordingly, in order to address these drawbacks, additional space is consumed in conventional FPCs having multiple connections to reduce the strain thereby resulting in large bezel sizes. Further, interconnects are conventionally performed using Anisotropic Conductive Film (ACF) and thus, the use of multiple interconnects creates finite contact resistance that is non-negligible and may adversely affect, e.g., attenuate, the signal being detected from the sensor.

Conventional touch sensors require an additional dedicated connection device to form a communicative coupling with other substrates (e.g., a motherboard or touch controller board) and thus involve multiple interconnects, such as an interconnect between the dedicated connection device and the touch sensor and another interconnect between the dedicated connection device and the other substrate. This could result in an increase in finite contact resistance, require a large bezel area to support a bend radius of the dedicated connection device, consume valuable space within a housing of a mobile computing device, and involve increased manufacturing and assembly costs. For thin film sensor, it also is a problem to locate receive/transmit FPC attachments close to each other due to deformation of film sensor in $1^{st}$ FPC attachment; to avoid this issue the connection areas are maintained away from each other increasing bezel, border.

Flexible touch sensor techniques are described. In one or more implementations, a flexible touch sensor is formed using a flexible substrate and flexible traces that form touch sensors, such as a capacitive grid. The flexible touch sensor includes an integrated interconnect/termination that is configured to bond directly to another substrate, such as a connector of a printed circuit board having a touch controller. In this way, a single connection is used through bending of the flexible touch sensor, which reduces electrical resistance, a size of a bezel area, and consumption of valuable space within the housing of the mobile computing device. These techniques are also applicable to non-touch based interactive devices where border is premium, e.g., vision based, force based interaction where interaction feedback needs to be communicated to other system board, and so on. Further discussion of these and other examples is described in relation to the following sections.

Example Environment

Figure 1:
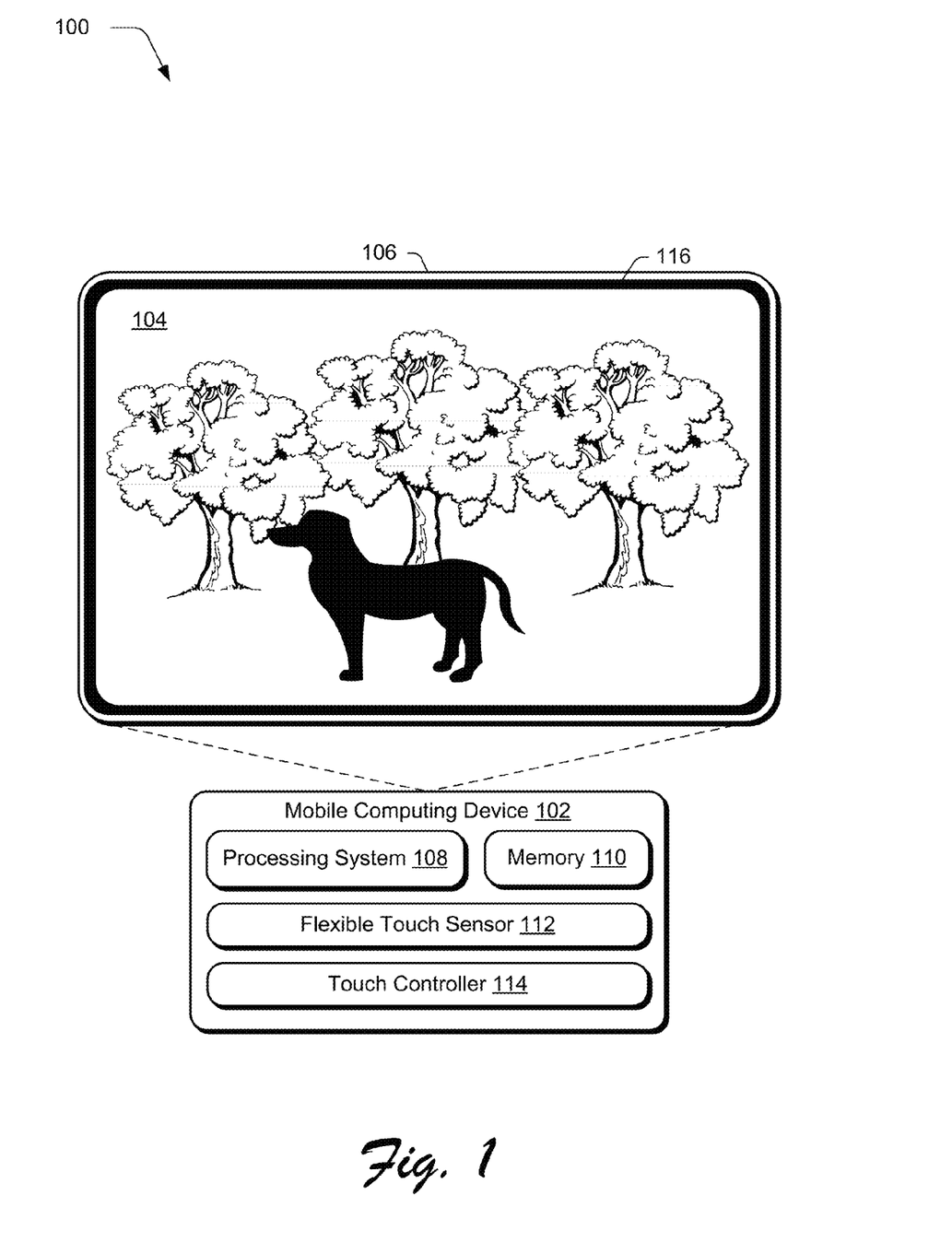
FIG. 1 is an illustration of an environment in an example implementation that is operable to employ flexible touch sensor techniques described herein.

FIG. 1 is an illustration of an environment 100 in an example implementation that is operable to employ flexible touch sensor techniques described herein. The illustrated environment 100 includes a mobile computing device 102 having a touchscreen device 104 secured to a housing 106 that is configured to be held by one or more hands of a user.

The mobile computing device 102 is configurable in a variety of ways. For example, the mobile computing device 102 may be configured as a mobile station, an entertainment appliance, a portable game device, may have a housing 106 configured in accordance with a handheld configuration (e.g., a mobile phone or tablet in a slate or clamshell configuration) and thus configured to be held by one or more hands of a user, and so forth. Thus, the mobile computing device 102 ranges from full resource devices with substantial memory and processor resources (e.g., tablet computers) to low-resource devices with limited memory and/or processing resources (e.g., hand-held music playing consoles).

The computing device 102 is illustrated as including a processing system 108, an example of a computer-readable storage medium illustrated as memory 110, the display device 104, a flexible touch sensor 112, and a touch controller 114. The processing system 108 is representative of functionality to perform operations through execution of instructions stored in the memory 110. Although illustrated separately, functionality of these components may be further divided, combined (e.g., on an application specific integrated circuit), and so forth. For example, the touch controller 114 may be incorporated as part of the processing system 108.

The flexible touch sensor 112 and touch controller 114 are representative of functionality to detect proximity of an object, such as a finger of a user's hand to detect a gesture. The flexible touch sensor 112, for instance, includes a plurality of transmission and receiving lines that are formed as a grid, an output of which is processed by the touch controller 114 to determine a relative location of an object in relation to the grid. Movement of the object is thus detectable as gestures by the touch controller 114, which is usable to initiate operations of the mobile computing device 102.

The flexible touch sensor 112 may be included on a variety of different devices. In an example, the flexible touch sensor 112 is formed as part of a dedicated touch pad as part of or separate from a keyboard to control movement of a cursor, perform bezel gestures, and so on. The flexible touch sensor 112, for instance, is configurable as part of a surface of the housing 106 to detect gestures, where the housing is being held by a user, and so forth. In another example, the flexible touch sensor 112 is configured to provide touchscreen functionality as part of the touchscreen device 104. The flexible touch sensors 112 in this instance are configured to be disposed over a display module of the touchscreen device 104 such that a user interface displayed by the display module is viewable by a user, e.g., the dog and trees in the illustrated example.

Flexibility of the flexible touch sensors 112 is usable to support a variety of different functionality. In an example of this functionality, the flexible touch sensor 112 is bendable to form a direct connection with another substrate, such as a printed circuit board having the touch controller. In this way, a single interconnect is used through bending of the flexible touch sensor 112. The single interconnect advantageously reduces electrical resistance in comparison with use of multiple interconnections. Additionally, the bending is usable to reduce a size of a bezel area 116 of the touchscreen device 104 and thus is also usable to reduce consumption of valuable space within the housing 106 of the mobile computing device 102.

Figure 2:
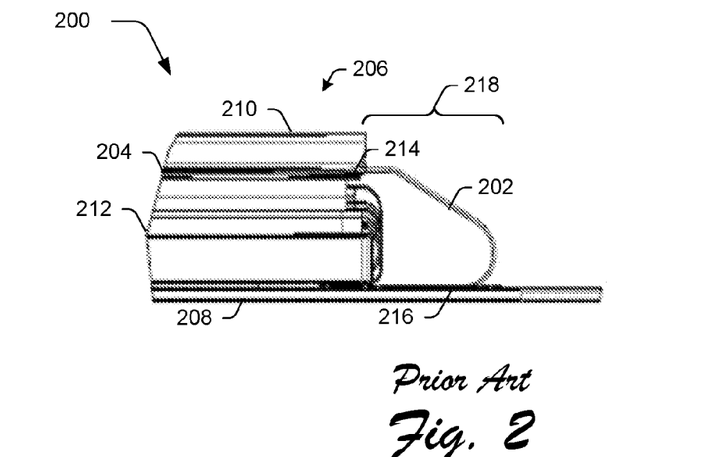
FIG. 2 depicts a prior art example of use of a dedicated connection device to connect a conventional touch sensor of a conventional touchscreen device to a conventional printed circuit board.

FIG. 2, for instance, depicts an example 200 of use of a dedicated connection device 202 to connect a conventional touch sensor 204 of a conventional touchscreen device 206 to a conventional printed circuit board 208. The conventional touch sensor 204 is illustrated as disposed between a cover glass 210 and a display module 212 of the conventional touchscreen device 106.

The dedicated connection device 202 is connected to the conventional touch sensor 204 using a first interconnect 214 and the dedicated connection device 202 is connected to the printed circuit board 208 using a second interconnect 216. Conventionally, this required optical, semi-automatic, or mechanical alignment and a need to account for placement in relation to each other and thus, cutting tolerances of the interconnect 214, 216 pitch are increased for assembly.

For example, if conventional interconnects are made with 20 um line width and 20 um space, the terminations need to be about 100 um wide and 100 um space. Naturally, this increases the termination interconnect width. In addition, interconnects 214, 216 are typically bonded using ACF (Anisotropic conductive film, an adhesive with electrically conductive particles), which creates finite contact resistance.

In FIG. 2, the dedicated connection device 202 is created using a flexible printed circuit, which creates issues when bending the FPCs and requires clearances from other system level components of a computing device for ease of assembly. Also the thickness of FPC and stiffness creates strain on the interconnect termination areas and can result in disconnection via peeling or delamination. One solution provides for strain relief area but this increases the lengths of the FPC and in many cases increases system dimensions, e.g., a border 218. This results in an increase in size of a bezel of the conventional mobile computing device. Further, the FPC attach process also suffers from yield loss and increases cost and thus in case of a conventional multiple interconnect 214, 216 system as illustrated this can be a significant cost driver.

Figure 3:
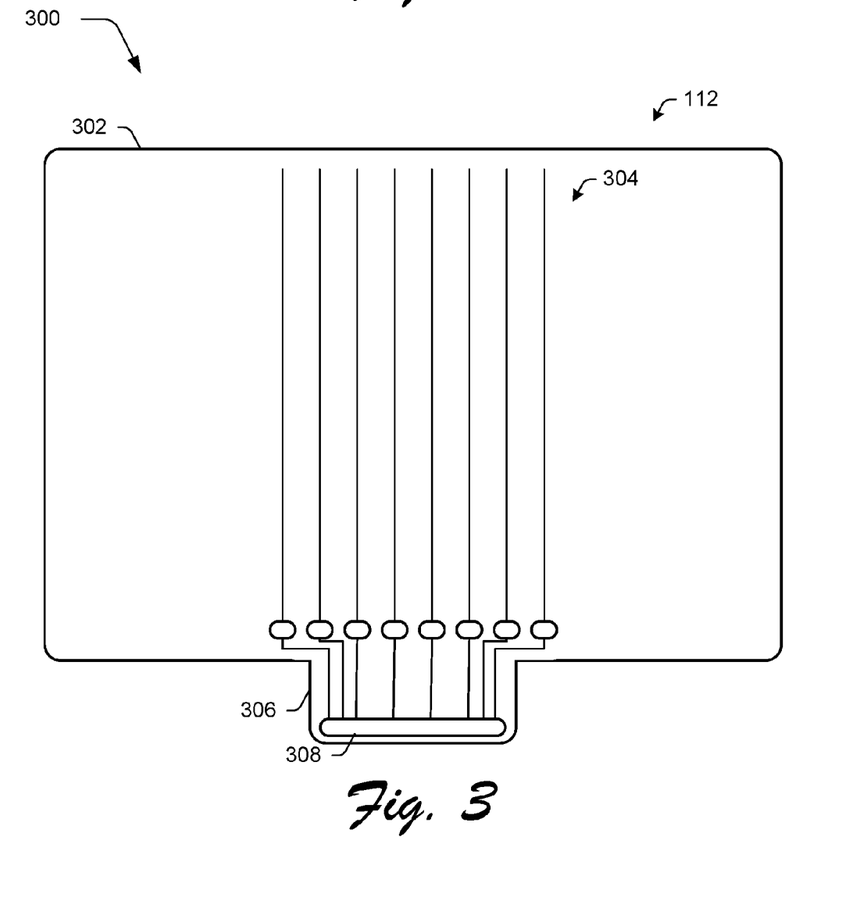
FIG. 3 depicts an example of a flexible touch sensor of FIG. 1 that is shown in greater detail.

FIG. 3 depicts an example 300 of the flexible touch sensor 112 of FIG. 1 that is shown in greater detail. The flexible touch sensor 112 includes a flexible substrate 302 having a plurality of flexible traces 304 formed thereon. The plurality of flexible traces are arranged to detect proximity of an object, such as in a grid arrangement include transmission and receiving lines. The flexible traces 304 are formable from a variety of different materials and configurations to support bending of the traces along with bending of the flexible substrate 302 without breaking, such as from a silver mesh, copper mesh, silver nano-wires, carbon nanotubes, graphene based sensors and so on.

The flexible touch sensor 112 includes an extension 306 of both the flexible substrate 302 and flexible traces 304 thereby forming an area that supports bending to form an interconnect with another substrate, e.g., a printed circuit board having the touch controller 114 of FIG. 1. Extensions of the flexible traces 304, for instance, are configured to directly terminate 308 onto a connector on the other substrate and thus a single interconnect is used rather than the multiple interconnects of conventional dedicated connection devices as shown in FIG. 2. In this way, a size of a bezel area may be reduced thereby promoting an increase in display area of a display device and portability of the mobile computing device 102 along with a decrease in electrical resistance, examples of which are described in the following and shown in corresponding figures.

Figure 4:
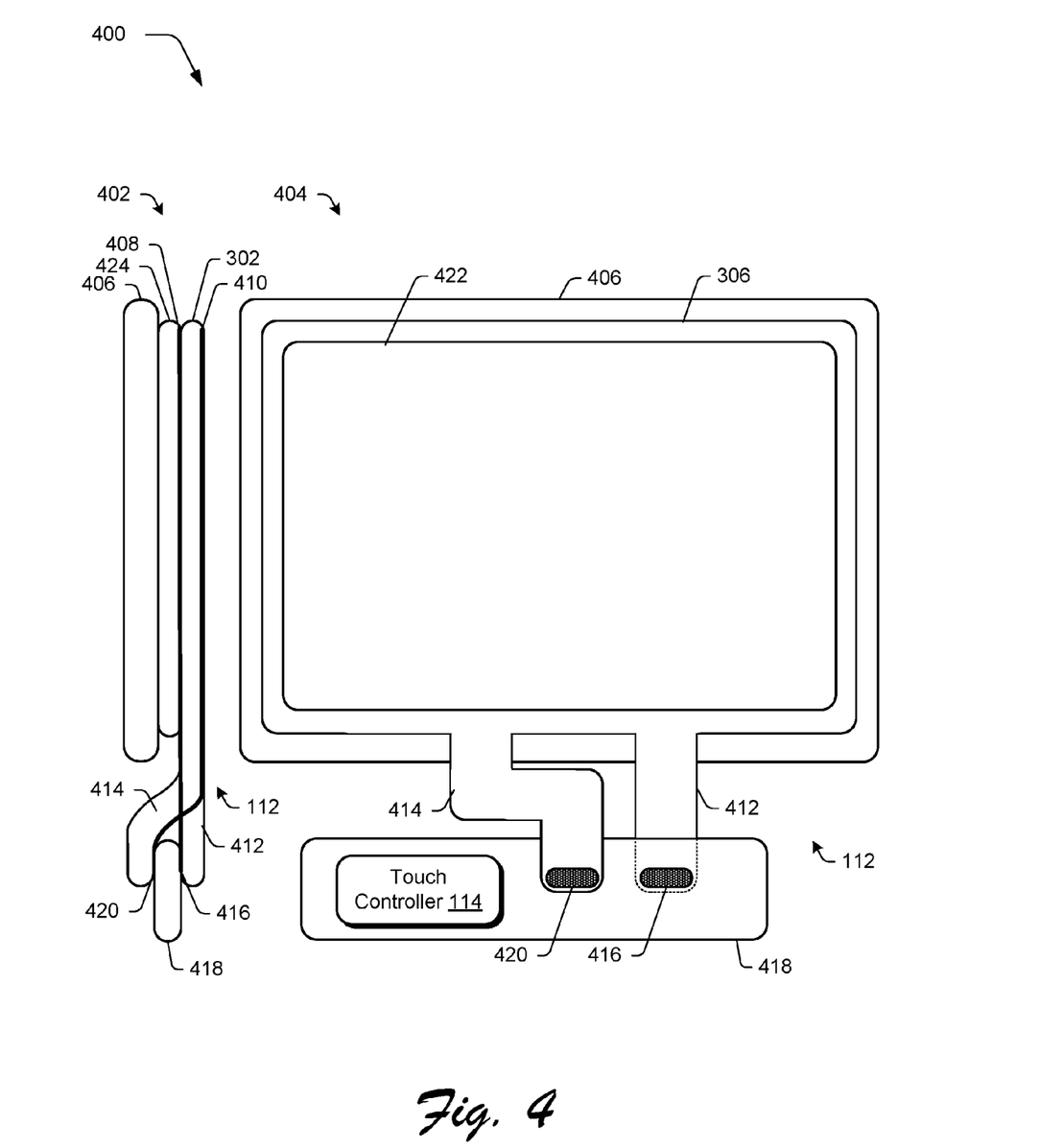
FIG. 4 depicts a system in an example implementation showing back and side views of a touchscreen device in an extended configuration.

FIG. 4 depicts a system 400 in an example implementation showing back and side views 402, 404 of a touchscreen device in an extended configuration. The touchscreen device 402, 404 includes a cover glass 406 that forms an outer surface when assembled as part of the mobile communications device 102. The touchscreen device 402 also includes the flexible substrate 302 that has flexible traces 304 formed thereon. In this example, the flexible traces 304 are configured as receiving lines 408 and transmission lines 410 that are formed on opposing sides of the flexible substrate 302. The flexible substrate 302 is secured to the cover glass 406 using an adhesive, e.g., an adhesive film 424.

The flexible touch sensor 112 in this example includes first and second extensions 412, 414 of the flexible substrate 302 and flexible traces, i.e., the receiving and transmission lines 408, 410. The first and second extensions 412, 414, in one or more implementations, are insulated to protect against signal interference. In this example, the extension 412 having the receiving lines 408 is secured to a connector 416 on one side of a printed circuit board 418 having the touch controller 114. Thus, the extension 412 communicatively couples the touch controller 114 to the receiving lines 408 of the flexible touch sensor 112 through bending of the flexible substrate 302 and flexible traces of the extension 412.

On the other hand, the extension 414 having the transmitting lines 410 is secured to a connector 420 on another side of a printed circuit board 418 having the touch controller 114 and thus communicatively couples the touch controller 114 to the transmitting lines 408 of the flexible touch sensor 112 through bending of the substrate and traces. Thus, in this example, flexible traces of the flexible touch sensor 112 are disposed on opposing sides of the flexible substrate 302 and are also interconnected to opposing sides of the printed circuit board 418 having the touch controller.

As illustrated in the back view, the flexible substrate 302 and corresponding touch sensors are disposed within an outline of the cover glass 406, such as to permit the cover glass 406 to be secured to the housing 106 of FIG. 1. A display area of a display module 422 is nested within an output of the flexible substrate 302 and corresponding touch sensors, which may be used to support bezel gestures and other edge sensing techniques. The touch controller 114 is configured to receive inputs from the flexible touch sensors 112 and detect a relative location of an object that is proximal to the sensors as previously described, such as through a capacitive grid arrangement.

Figure 5:
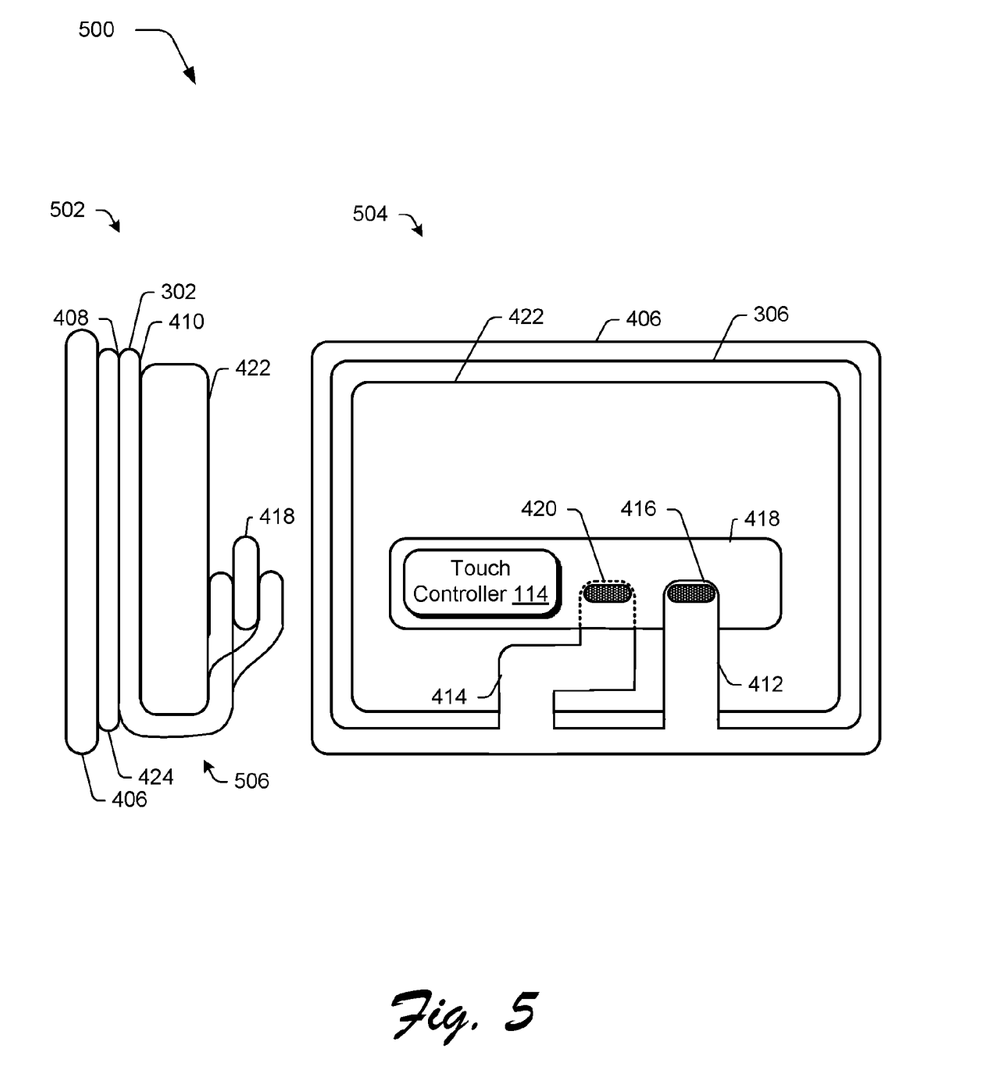
FIG. 5 depicts a system in an example implementation showing back and side views of a touchscreen device of FIG. 4 in a folded configuration that bends around a display module of a touchscreen device. It should be noted in FIGS. 4 and 5 that the implementation can be done on single sided sensor (one side of film) as well. These single sided sensors are used in mobile devices.

FIG. 5 depicts a system 500 in an example implementation showing back and side views 502, 504 of a touchscreen device of FIG. 4 in a folded configuration that bends around a display module of a touchscreen device. In this example, the flexible substrate 302 and flexible traces are bent 506 around a display module 422. This positions the printed circuit board 418 having the touch controller 114 to a rear of the display module 422, e.g., opposite a side of the display module 422 that outputs the display for viewing by a user.

Flexibility of the flexible substrate 302 and integrated flexible traces permits the bend 506 to be achieved in a manner that minimizes an amount of bezel area consumed by the bend. This is useful to reduce a size of a bezel as may be appreciated through comparison with the example of FIG. 2 that required strain relief through extending a loop length, and therefore a larger bend radius, of dedicated connection device 202. For example, the single interconnections between the touch sensors of the flexible substrate and the printed circuit board 418 support a tighter bend radius that may follow an outer surface of the display module 422. Additionally, electrical resistance is reduced through use of a single interconnect. Thus, in this example, the extensions 412, 414 of the flexible traces form a direct connection with the connectors 416, 420 of the printed circuit board 418 on opposing sides of the printed circuit board 418. Other examples are also contemplated, further discussion of which is described in the following and shown in a corresponding figure.

Figure 6:
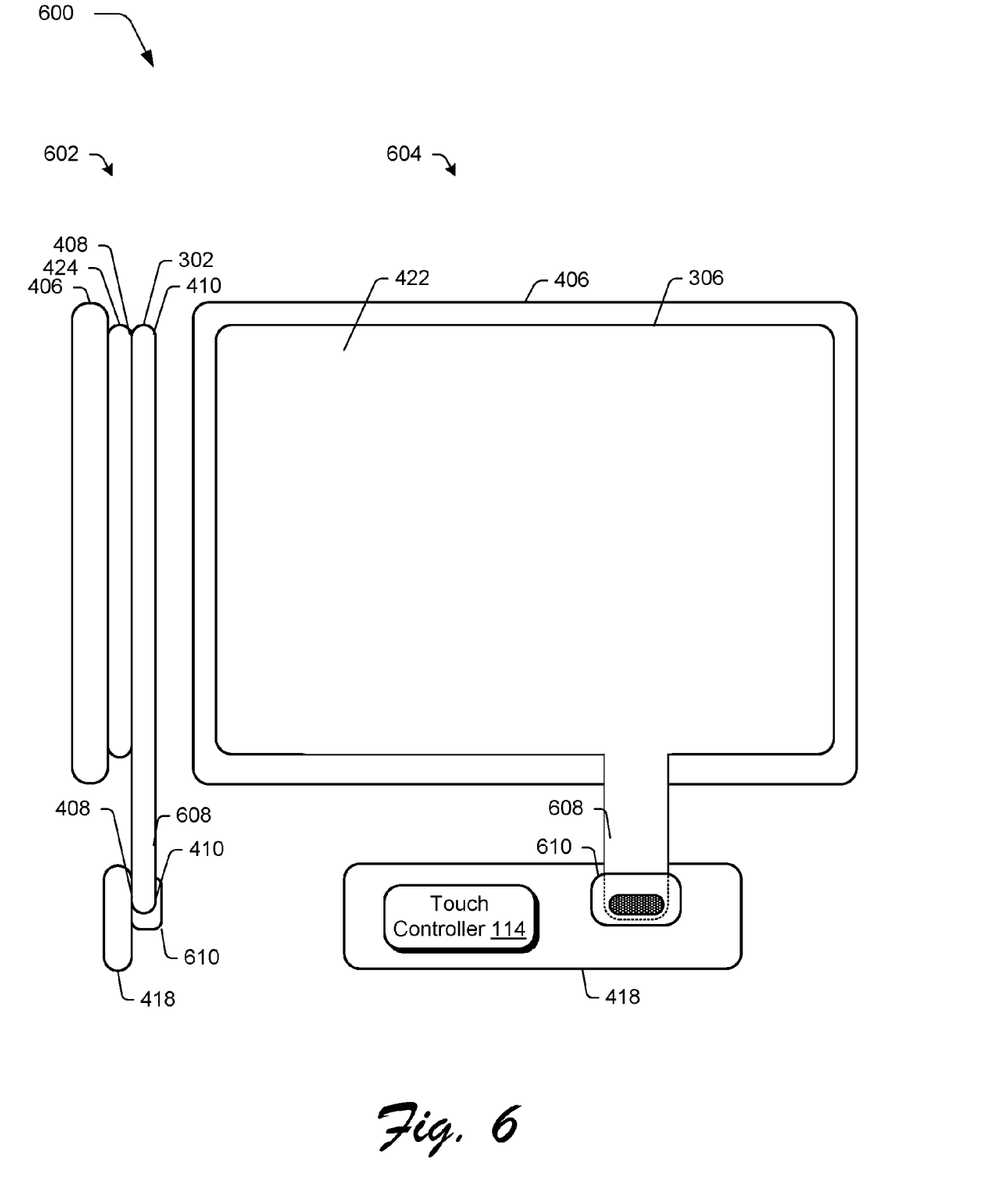
FIG. 6 depicts a system in an example implementation showing back and side views of a touchscreen device of FIG. 4 communicatively coupled to the printed circuit board having the touch controller using a two-sided connector. It should be noted that the touch controller can also be part of CPU/host processor (i.e. not only dedicated touch controller is needed).

FIG. 6 depicts a system 600 in an example implementation showing back and side views 602, 604 of a touchscreen device of FIG. 4 communicatively coupled to the printed circuit board 418 having the touch controller 114 using a two-sided connector 610. In this example, the flexible substrate 302 and corresponding flexible traces have a single two-sided extension 608 having receiving lines 408 on one side and transmitting lines 410 on an opposing side of the flexible substrate 302 such that these extensions directly oppose each other.

A two-sided connector 610 is disposed on a single side of the printed circuit board 418 having the touch controller 114. The two-sided connector 610 includes a cavity that is configured to receive the single two-sided extension 608. Connectors are disposed on opposing sides of the cavity and configured to contact respect ones of the receiving and transmitting lines 408, 410 of the flexible traces. In one or more implementations, the extension and the connector are secured to each other, such as through use of an adhesive, mechanical retention device, and so forth. Thus, as described the flexible touch sensor is configurable in a variety of ways to support increased efficiency, space considerations, and preserve a mobile form factor of the mobile computing device 102.

Example System and Device

Figure 7:
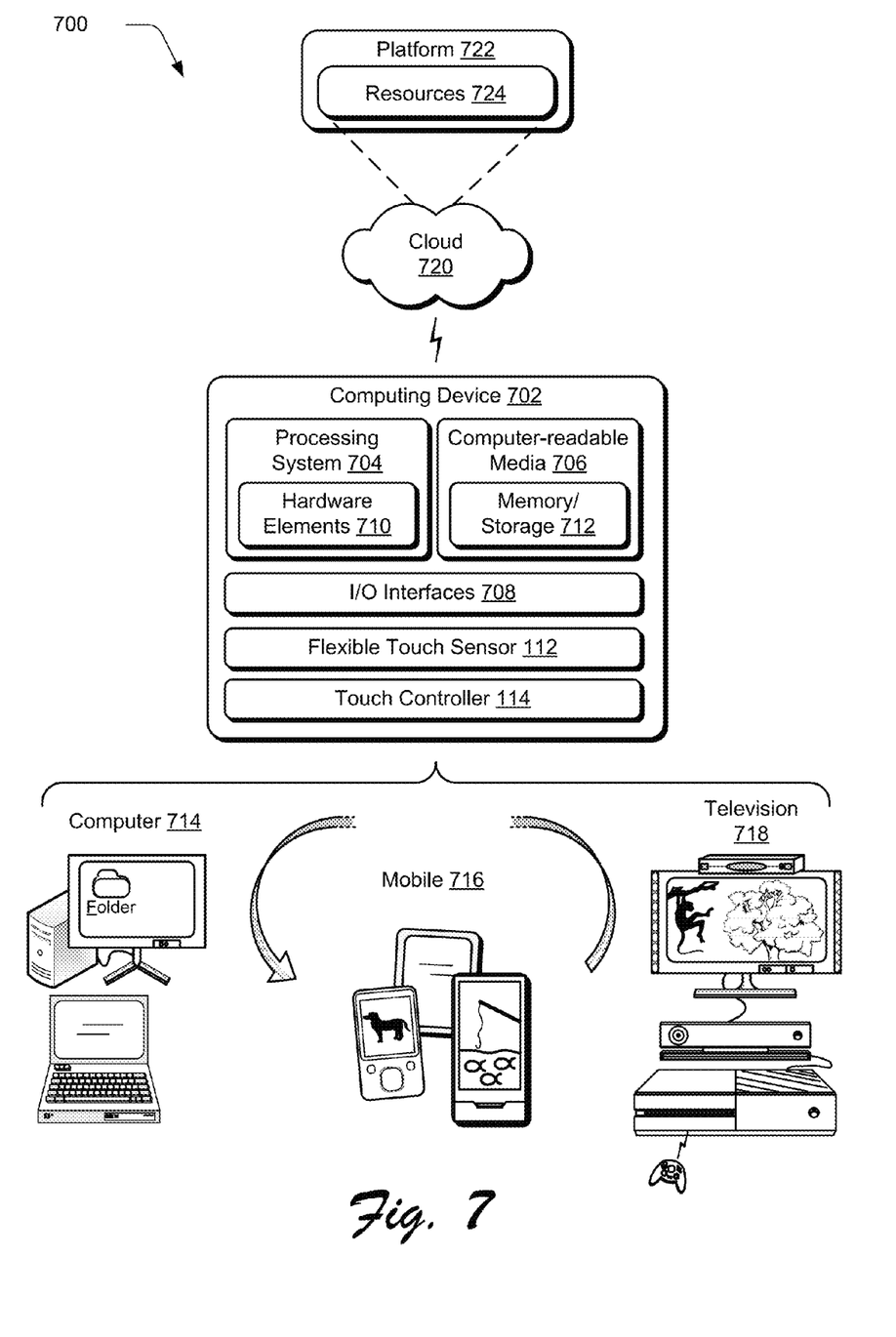
FIG. 7 illustrates an example system including various components of an example device that can be implemented as any type of computing device as described with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein as illustrated through inclusion of the flexible touch sensor 112 and touch controller 114. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION AND EXAMPLE IMPLEMENTATIONS

Example implementations described herein include, but are not limited to, one or any combinations of one or more of the following examples:

An example touch sensitive device includes a printed circuit board (PCB) having a touch controller and a flexible printed circuit having a flexible substrate and touch sensors formed thereon using a plurality of flexible traces arranged to detect proximity of an object. The plurality of flexible traces are extended along the flexible substrate to directly terminate onto a connector of the printed circuit board thereby forming a communicative coupling between the touch sensors and the touch controller, which thereby permits the touch controller to determine a location of the proximity of the object in relation to the touch sensors.

An example touch sensitive device as described alone or in combination with any of the above or below examples, wherein the flexible printed circuit board is configured to be disposed over a display module such that a display of the display module is viewable through the flexible printed circuit.

An example touch sensitive device as described alone or in combination with any of the above or below examples, wherein the plurality of flexible traces are arranged in a grid pattern having transmission and receiving lines that together are configured to detect the proximity of the object.

An example touch sensitive device as described alone or in combination with any of the above or below examples, wherein the plurality of receiving lines are formed on one side of the flexible substrate and the plurality of transmission lines are formed on another side of the substrate.

An example touch sensitive device as described alone or in combination with any of the above or below examples, wherein the receiving lines are connected to the connector on one side of the printed circuit board and the transmission lines are connected to the connector on another side of the printed circuit board.

An example touch sensitive device as described alone or in combination with any of the above or below examples, wherein the plurality of flexible traces are configured to detect the proximity of the object using capacitance.

An example touch sensitive device as described alone or in combination with any of the above or below examples, wherein the plurality of flexible traces are formed from a silver mesh, copper mesh, silver nano-wires, or carbon nanotubes, Graphene.

An example touch sensitive device as described alone or in combination with any of the above or below examples, wherein the connector is a sole connector involving use of a bond between the plurality of flexible traces to the touch controller.

An example touch sensitive device as described alone or in combination with any of the above or below examples, wherein the plurality of flexible traces of the touch sensors are formed as an integral part of the flexible substrate of the printed circuit.

An example touch sensitive device as described alone or in combination with any of the above or below examples, wherein at least a portion of the flexible substrate and the flexible traces bends to form the communicative coupling to the connector of the touch controller of the printed circuit board.

An example touchscreen device includes a display module configured to output a display that is viewable by a user, a printed circuit board (PCB) having a touch controller and a connector, and a flexible printed circuit having a flexible substrate and touch sensors disposed proximate to a surface of the display module and through which the display is viewable by the user. The touch sensors are formed using a plurality of flexible traces that are extended along the flexible substrate to directly terminate onto the connector of the printed circuit board thereby forming a communicative coupling between the touch sensors and the touch controller.

A touchscreen device as described alone or in combination with any of the above or below examples, wherein the plurality of flexible traces directly terminate onto the connector and are bonded thereto using a conductive film.

A touchscreen device as described alone or in combination with any of the above or below examples, wherein the connector is a sole connector between the plurality of flexible traces and the touch controller.

A touchscreen device as described alone or in combination with any of the above or below examples, wherein the plurality of flexible traces are arranged in a grid pattern having transmission and receiving lines that together are configured to detect proximity of the object, the plurality of receiving lines formed on one side of the flexible substrate and the plurality of transmission lines are formed on a another side of the substrate. In some implementation, both transmit and receive can be on the same side. Although capacitive sensor are described, these techniques are equally applicable to resistive-type sensors.

A touchscreen device as described alone or in combination with any of the above or below examples, wherein extensions of the receiving lines are connected to the connector on one side of the printed circuit board and extensions of the transmission lines are connected to the connector on another side of the printed circuit board.

A touchscreen device as described alone or in combination with any of the above or below examples, wherein extensions of the receiving lines one side of the flexible substrate and extensions of transmission lines on the other side of the flexible substrate that are directly connected to the connector are directly opposite each other on the one side and the other side of the flexible substrate.

A touchscreen device as described alone or in combination with any of the above or below examples, wherein bending of extensions of the receiving lines on one side of the flexible substrate and extensions of transmission lines on the other side of the flexible substrate positions the touch controller behind the display module.

An example mobile communications device includes a housing configured to be held by one or more hands of a user, one or more modules implemented at least partially in hardware and configured to generate a user interface, and a touchscreen device secured to the housing. The touchscreen device includes a display module configured to output a display of the user interface that is viewable by a user, a printed circuit board (PCB) having a touch controller and a connector, and a flexible printed circuit having a flexible substrate and touch sensors disposed proximate to a surface of the display module. The touch sensors are formed using a plurality of flexible traces that are extended along the flexible substrate forming extensions that bend around the display module to directly terminate onto the connector of the printed circuit board thereby forming a communicative coupling between the touch sensors and the touch controller.

A mobile communications device as described alone or in combination with any of the above or below examples, wherein bending of the flexible substrate positions the touch controller behind the display module on an opposing side that displays the user interface.

A mobile communications device as described alone or in combination with any of the above or below examples, wherein the touch controller is configured to determine a relative location of the object in relation to the touch sensors.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A touch sensitive device comprising:
   a printed circuit board (PCB) having a touch controller; and
   a flexible printed circuit having a flexible substrate and touch sensors formed thereon using a plurality of flexible sensor traces arranged to detect proximity of an object,
   the plurality of flexible sensor traces arranged in a grid pattern of transmission and receiving lines that together detect the proximity of the object, the receiving lines formed and connected to a connector on one side of the printed circuit board, and the transmission lines formed and connected to the connector on another side of the printed circuit board, the plurality of flexible sensor traces extended along the flexible substrate to directly terminate onto the connector of the printed circuit board thereby forming a communicative coupling between the touch sensors and the touch controller that is usable to permit the touch controller to determine a location of the proximity of the object in relation to the touch sensors; and
   the flexible substrate and the flexible sensor traces forming a single interconnect portion of the flexible printed circuit that supports bending and directly terminates the flexible sensor traces at the connector of the printed circuit board, the single interconnect portion of the flexible printed circuit designed for a bend radius that minimizes an amount of bezel area of the touch sensitive device consumed by said bending.

2. The touch sensitive device as described in claim 1, wherein the flexible printed circuit is configured to be disposed over a display module such that a display of the display module is viewable through the flexible printed circuit.

3. The touch sensitive device as described in claim 1, wherein the plurality of flexible sensor traces are configured to detect the proximity of the object using capacitance.

4. The touch sensitive device as described in claim 1, wherein the plurality of flexible sensor traces are formed from a silver mesh, copper mesh, silver nano-wires, or carbon nanotubes.

5. The touch sensitive device as described in claim 1, wherein the single interconnect limits electrical resistance.

6. The touch sensitive device as described in claim 1, wherein the plurality of flexible sensor traces of the touch sensors are formed as an integral part of the flexible substrate of the printed circuit.

7. The touch sensitive device as described in claim 1, wherein the single interconnect directly terminates onto the connector of the printed circuit board to allow a change in a display area of a display device coupled to the touch sensitive device.

8. The touch sensitive device as described in claim 1, wherein the flexible printed circuit is applied to a non-display side of the display module.

9. A touchscreen device comprising:
   a display module configured to output a display for viewing;
   a printed circuit board (PCB) having a touch controller and a connector;
   a flexible printed circuit having a flexible substrate and touch sensors disposed proximate to a surface of the display module and through which the display is viewable, the touch sensors formed using a plurality of flexible sensor traces arranged in a grid pattern of transmission and receiving lines that together detect the proximity of an object, the receiving lines formed and connected to the connector on one side of the flexible substrate, and the transmission lines formed and connected to the connector on another side of the flexible substrate, the plurality of flexible sensor traces extended along the flexible substrate to directly terminate onto the connector of the printed circuit board thereby forming a communicative coupling between the touch sensors and the touch controller; and
   the flexible substrate including a portion that terminates directly to the connector on the printed circuit board such that the plurality of flexible sensor traces directly terminate onto the connector of the printed circuit board forming a single interconnect portion of the flexible printed circuit, the flexible substrate and the flexible sensor traces permitting a bend having a bend radius that follows a surface of the display module and through an amount of bezel area, a bending of extensions of the receiving lines on one side of the flexible substrate and extensions of transmission lines on the other side of the flexible substrate allowing the touch controller being positionable behind the display module.

10. The touchscreen device as described in claim 9, wherein the plurality of flexible sensor traces are bonded onto the connector of the printed circuit board using a conductive film.

11. The touchscreen device as described in claim 9, wherein the connector of the printed circuit board is a sole connector between the plurality of flexible sensor traces and the touch controller.

12. The touchscreen device as described in claim 9, wherein extensions of the receiving lines are connected to the connector on one side of the printed circuit board and extensions of the transmission lines are connected to the connector on another side of the printed circuit board.

13. The touchscreen device as described in claim 9, wherein extensions of the receiving lines on one side of the flexible substrate and extensions of the transmission lines on the other side of the flexible substrate are directly connected to the connector of the printed circuit board and are directly opposite each other on the one side and the other side of the flexible substrate.

14. The touchscreen device as described in claim 9, wherein extensions of the receiving lines and the extensions of the transmission lines are disposed on a same side of the printed circuit board.

15. A mobile communications device comprising:
a touchscreen device secured in a housing of the mobile communications device, the touchscreen device including a display module configured to output a display of a user interface;
a printed circuit board (PCB) having a touch controller and a connector; and
a flexible printed circuit having a flexible substrate and touch sensors disposed proximate to a first surface of the display module, the touch sensors formed using a plurality of flexible sensor traces arranged in a grid pattern of transmission and receiving lines that together detect the proximity of an object, the receiving lines formed and connected to the connector on one side of the flexible substrate, and the transmission lines formed and connected to the connector on another side of the flexible substrate, the plurality of flexible sensor traces extended along the flexible substrate forming extensions that bend around the display module at a bend radius through an amount of bezel area in accordance with the bend radius to directly terminate onto the connector of the printed circuit board thereby forming a communicative coupling between the touch sensors and the touch controller,
the connector of the printed circuit board disposed proximate to a second surface of the display module that opposes the first surface, the plurality of flexible sensor traces extended to said directly terminate onto the connector of the printed circuit board forming a single interconnect portion of the printed circuit board and designed for the bend radius that minimizes the amount of the bezel area consumed by the bend radius.

16. The mobile communications device as described in claim 15, wherein bending of the portion of the flexible substrate positions the touch controller behind the display module on an opposing side that displays the user interface.

17. The mobile communications device as described in claim 15, wherein the touch controller is configured to determine a relative location of the object in relation to the touch sensors.

18. The mobile communications device as described in claim 15, wherein the flexible printed circuit is configured to be disposed over the display module such that the display of the user interface is viewable through the flexible printed circuit.

19. The mobile communications device as described in claim 15, wherein the plurality of flexible sensor traces are configured to detect the proximity of the object using capacitance.

20. The mobile communications device as described in claim 15, wherein the plurality of flexible sensor traces of the touch sensors are formed as an integral part of the flexible substrate of the flexible printed circuit.

* * * * *